JACOB WEIBLE AND HENRY S. ROBINSON, OF DETROIT, MICHIGAN.

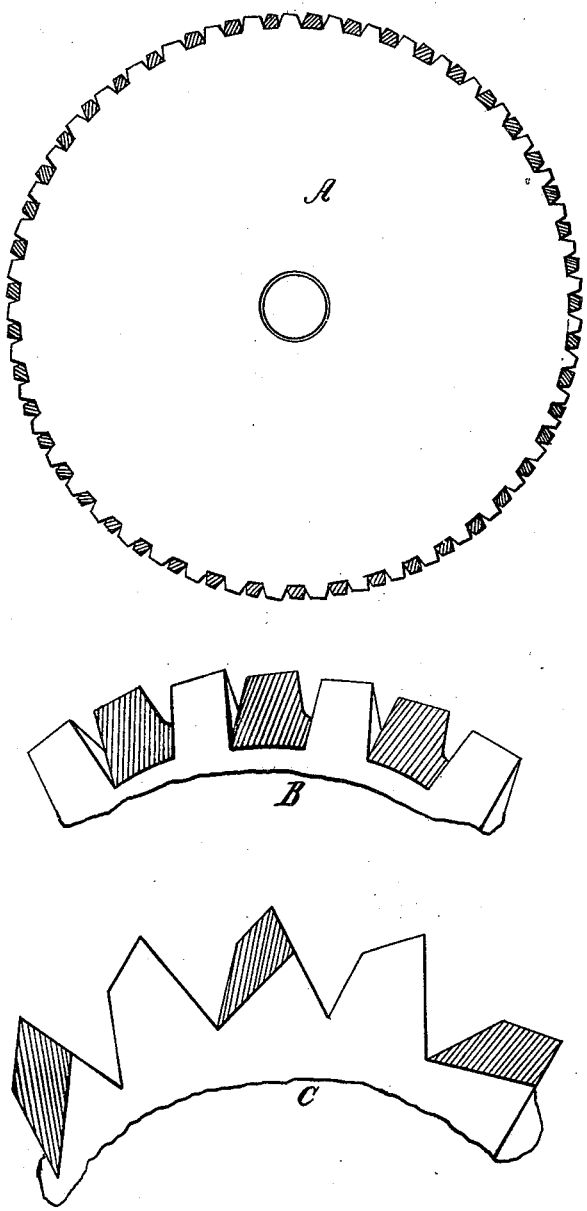

Letters Patent No. 87,891, dated March 16, 1869.

IMPROVEMENT IN CIRCULAR SAWS.

The Schedule referred to in these Letters Patent and making part of the same Be it known that we, JACOB WEIBLE and HENRY S. ROBINSON, both citizens of the United States, and residents of Detroit, in the State of Michigan, have invented a new and improved Smooth-Cutting Crosscut Circular Saw; and we hereby declare that the following is a full and exact description thereof, reference being had to the accompanying drawings, and to the letters of reference marked thereon.

We venture an explanatory remark or two, by way of bringing out more clearly the nature and benefit of this invention.

All circular crosscut-saws hitherto in use, are found to rip, or tear through the wood to which they are applied, leaving a rough and uneven, or ragged surface on both sides of the material sawed. For this reason, also, it was found to be almost impossible to use with advantage the crosscut circular saw in dividing thin woods, such as are used for making light boxes, like cigar-boxes, &c., and when woods were so cut, they were left with ragged edges, requiring the additional labor and application of a plane.

The saw herein described cuts through the thinnest boards, and makes both sides equally smooth and clean, and quite as even as if they had been delicately planed. It will also cut through spongy, or soft wood, or other material, such as cork, giving smooth sides as it passes. The lumber thus cut can be put directly into boxes, without the necessity of smoothing or planing.

The saw more particularly herein described will pass through, at one time, ten pieces of three-sixteenths of an inch stuff, and is generally so applied.

This circular saw may be of any desired diameter or gauge, and its especial merit, and the merit of this our invention, consists in the peculiar shape and sharpness of the teeth. The set not being material, may be after the manner of any ordinary circular saw.

In order to make such a saw, we take a piece of steel, of the diameter desired, circular in shape, with the ordinary hole for the mandrel in the centre, as is represented in the drawings herewith, marked A.

Then, with a small square file, we proceed to construct the teeth around the entire saw, by filing off the edge thereof to the width (on a ten-inch diameter saw, such as is represented on the drawing, marked B,) of three-sixteenths ($\frac{3}{16}$) of an inch, and a depth, or length of about one-eighth ($\frac{1}{8}$) of an inch, imparting to each tooth thus made a knife-like edge, or sharpness on the front and upper line thereof, such front line, on a saw of ten inches diameter, being perpendicular to the axis, and a trifle, say the thirty-secondth ($\frac{1}{32}$), of an inch, shorter in depth than the rear line of said tooth.

These teeth are constructed around the edge of the saw, at an angle of, say, eighty degrees with the saw itself, and are thus alternately and successively inclined right and left about and around the entire edge of the saw.

Being thus sharpened, they cut their way through the wood as a knife or plane, without tearing or roughening the surface, as is the manner of ordinary circular saws.

Saws of larger diameter and heavier form, and designed for sawing heavier woods, may be and are, in our construction of them, furnished with teeth proportionally larger in size than are those of the saw already described; and these teeth are made in the way they are ordinarily constructed on circular saws. They are then filed two-thirds or one-half the way down, so as to give them a sharp, or knife-like edge on the upper line thereof, and on the front edge they are likewise so sharpened, wholly or partially, as may be desired. These teeth are then set with an alternate right and left inclination around the edge of the saw, as has been already described, and at about the same angle with the axis of the saw. They are represented in the drawing, marked C.

We disclaim any invention as to the mere form of the saw as a circular saw.

What we claim as our invention, is—

The improved mode of constructing circular saws, as herein shown and described, and for the purpose set forth.

JACOB WEIBLE.
HENRY S. ROBINSON.

Witnesses:
HENRY M. DUFFIELD,
D. BETHUNE DUFFIELD.